(12) United States Patent
Kao et al.

(10) Patent No.: US 6,514,170 B1
(45) Date of Patent: Feb. 4, 2003

(54) FAMILY OF MULTI-SPEED TRANSMISSION MECHANISMS HAVING THREE PLANETARY GEAR SETS AND FIVE TORQUE-TRANSMITTING MECHANISMS

(75) Inventors: Chi-Kuan Kao, Troy, MI (US); Patrick Benedict Usoro, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/956,519

(22) Filed: Sep. 19, 2001

(51) Int. Cl.⁷ ................................................ F16H 3/62
(52) U.S. Cl. ..................................................... 475/296
(58) Field of Search ................................. 475/269, 296

(56) References Cited

U.S. PATENT DOCUMENTS

| | | | | |
|---|---|---|---|---|
| 3,929,037 A | * | 12/1975 | Marsch | 475/218 |
| 4,070,927 A | | 1/1978 | Polak | |
| 5,106,352 A | | 4/1992 | Lepelletier | 475/280 |
| 5,315,898 A | * | 5/1994 | Koyama et al. | 475/330 |
| 5,542,889 A | * | 8/1996 | Pierce et al. | 475/275 |
| 5,599,251 A | | 2/1997 | Beim et al. | 475/275 |
| 6,071,208 A | | 6/2000 | Koivunen | 475/275 |
| 6,425,841 B1 | * | 7/2002 | Haka | 475/275 |

FOREIGN PATENT DOCUMENTS

JP        9-126283        5/1997

* cited by examiner

*Primary Examiner*—Sherry Estremsky
(74) *Attorney, Agent, or Firm*—Kathryn A. Marra

(57) ABSTRACT

The family of transmissions has a plurality of members that can be utilized in powertrains to provide at least six forward speed ratios and one reverse speed ratio. The transmission family members include three planetary gear sets and five torque transmitting mechanisms. The powertrain includes an engine and torque converter that is continuously connected to at least one member of the planetary gear arrangement and an output member that is continuously connected with another of the planetary gear members. At least one other planetary gear member is continuously connected with the transmission housing. The five torque transmitting mechanisms provide interconnections between various gear members and with either the input or output shaft, in some instances, and are operated in combinations of two to establish at least six forward speed ratios.

11 Claims, 12 Drawing Sheets

|  | RATIOS | 50 | 52 | 54 | 56 | 58 |
|---|---|---|---|---|---|---|
| REVERSE | -1.82 |  | X |  |  | X |
| NEUTRAL | 0 |  | X |  |  |  |
| 1 | 3.5 | X | X |  |  |  |
| 2 | 2.02 | X |  |  |  | X |
| 3 | 1.41 | X |  |  | X |  |
| 4 | 1 | X |  | X |  |  |
| 5 | 0.73 |  |  | X |  | X |
| 6 | 0.55 |  | X | X |  |  |

(X = ENGAGED CLUTCH)

$\frac{\text{RING GEAR}}{\text{SUN GEAR}}$ TOOTH RATIO: $\frac{R_1}{S_1} = 2.33$, $\frac{R_2}{S_2} = 1.63$, $\frac{R_3}{S_3} = 2.50$

| RATIO SPREAD | 6.32 |
|---|---|
| RATIO STEPS |  |
| REV/1 | -0.52 |
| 1/2 | 1.73 |
| 2/3 | 1.43 |
| 3/4 | 1.41 |
| 4/5 | 1.37 |
| 5/6 | 1.32 |

| | RATIOS | 150 | 152 | 154 | 156 | 158 |
|---|---|---|---|---|---|---|
| REVERSE | -1.73 | X | | | | X |
| NEUTRAL | 0 | | | | | |
| 1 | 3.4 | | X | X | | |
| 2 | 1.96 | | X | | X | |
| 3 | 1.31 | | X | | | X |
| 4 | 1 | | | X | | X |
| 5 | 0.68 | X | | X | | |
| 6 | 0.6 | X | | | X | |

(X = ENGAGED CLUTCH)

$\dfrac{\text{RING GEAR}}{\text{SUN GEAR}}$ TOOTH RATIO: $\dfrac{R_1}{S_1} = 1.50$, $\dfrac{R_2}{S_2} = 2.37$, $\dfrac{R_3}{S_3} = 2.40$

| RATIO SPREAD | 5.67 |
|---|---|
| RATIO STEPS | |
| REV/1 | -0.51 |
| 1/2 | 1.73 |
| 2/3 | 1.49 |
| 3/4 | 1.31 |
| 4/5 | 1.47 |
| 5/6 | 1.13 |

|  | RATIOS | 250 | 252 | 254 | 256 | 258 |
|---|---|---|---|---|---|---|
| REVERSE | -1.88 | X |  |  | X |  |
| NEUTRAL | 0 | X |  |  |  |  |
| 1 | 3.62 | X |  | X |  |  |
| 2 | 2.23 |  |  | X | X |  |
| 3 | 1.52 |  |  | X |  | X |
| 4 | 1 |  |  |  | X | X |
| 5 | 0.78 |  | X |  |  | X |
| 6 | 0.56 | X |  |  |  | X |

(X = ENGAGED CLUTCH)

$\underline{\text{RING GEAR}}$ TOOTH RATIO: $\frac{R_1}{S_1} = 2.33$, $\frac{R_2}{S_2} = 1.88$, $\frac{R_3}{S_3} = 1.93$
SUN GEAR

| RATIO SPREAD | 6.5 |
|---|---|
| RATIO STEPS |  |
| REV/1 | -0.52 |
| 1/2 | 1.62 |
| 2/3 | 1.47 |
| 3/4 | 1.52 |
| 4/5 | 1.29 |
| 5/6 | 1.4 |

| | RATIOS | 350 | 352 | 354 | 356 | 358 |
|---|---|---|---|---|---|---|
| REVERSE | -4.02 | | X | X | | |
| NEUTRAL | 0 | | X | | | |
| 1 | 4.33 | | X | | | X |
| 2 | 2.67 | X | X | | | |
| 3 | 1.56 | X | | | | X |
| 4 | 1 | | | | X | X |
| 5 | 0.71 | | | X | X | |
| 6 | 0.55 | | | X | | X |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 3.00$, $\frac{R_3}{S_3} = 1.67$

| RATIO SPREAD | 7.94 |
|---|---|
| RATIO STEPS | |
| REV/1 | -0.93 |
| 1/2 | 1.62 |
| 2/3 | 1.71 |
| 3/4 | 1.56 |
| 4/5 | 1.42 |
| 5/6 | 1.29 |

| | RATIOS | 450 | 452 | 454 | 456 | 458 |
|---|---|---|---|---|---|---|
| REVERSE | -1.28 | | | X | | X |
| NEUTRAL | 0 | | | | | X |
| 1 | 2.49 | | X | | | X |
| 2 | 1.5 | X | | | | X |
| 3 | 1 | | | | X | X |
| 4 | 0.67 | X | | | X | |
| 5 | 0.53 | | | X | X | |
| 6 | 0.4 | X | | X | | |

(X = ENGAGED CLUTCH)

$\frac{\text{RING GEAR}}{\text{SUN GEAR}}$ TOOTH RATIO: $\frac{R_1}{S_1} = 2.00$, $\frac{R_2}{S_2} = 2.01$, $\frac{R_3}{S_3} = 1.51$

| RATIO SPREAD | 6.24 |
|---|---|
| RATIO STEPS | |
| REV/1 | -0.51 |
| 1/2 | 1.66 |
| 2/3 | 1.5 |
| 3/4 | 1.5 |
| 4/5 | 1.27 |
| 5/6 | 1.32 |

| | RATIOS | 550 | 552 | 554 | 556 | 558 |
|---|---|---|---|---|---|---|
| REVERSE | -1.53 | X | | X | | |
| NEUTRAL | 0 | X | | | | |
| 1 | 2.88 | X | | | | X |
| 2 | 1.73 | | | X | | X |
| 3 | 1 | | | | X | X |
| 4 | 0.68 | | | X | X | |
| 5 | 0.56 | | X | | X | |
| 6 | 0.45 | X | | | X | |

(X = ENGAGED CLUTCH)

$\dfrac{\text{RING GEAR}}{\text{SUN GEAR}}$ TOOTH RATIO: $\dfrac{R_1}{S_1} = 1.57$, $\dfrac{R_2}{S_2} = 1.88$, $\dfrac{R_3}{S_3} = 1.88$

| RATIO SPREAD | 6.43 |
|---|---|
| RATIO STEPS | |
| REV/1 | -0.53 |
| 1/2 | 1.66 |
| 2/3 | 1.73 |
| 3/4 | 1.48 |
| 4/5 | 1.21 |
| 5/6 | 1.24 |

| | RATIOS | 650 | 652 | 654 | 656 | 658 |
|---|---|---|---|---|---|---|
| REVERSE | -2.05 | | X | | | X |
| NEUTRAL | 0 | | X | | | |
| 1 | 2.86 | | X | X | | |
| 2 | 1.5 | | X | | X | |
| 3 | 1 | | | X | X | |
| 4 | 0.73 | X | | | X | |
| 5 | 0.61 | X | | X | | |
| 6 | 0.46 | X | | | | X |

(X = ENGAGED CLUTCH)

$\frac{\text{RING GEAR}}{\text{SUN GEAR}}$ TOOTH RATIO: $\frac{R_1}{S_1} = 1.86$, $\frac{R_2}{S_2} = 1.70$, $\frac{R_3}{S_3} = 2.73$

| RATIO SPREAD | 6.15 |
|---|---|
| RATIO STEPS | |
| REV/1 | -0.72 |
| 1/2 | 1.91 |
| 2/3 | 1.5 |
| 3/4 | 1.37 |
| 4/5 | 1.2 |
| 5/6 | 1.31 |

| | RATIOS | 750 | 752 | 754 | 756 | 758 |
|---|---|---|---|---|---|---|
| REVERSE | -2.3 | | | X | | X |
| NEUTRAL | 0 | | | | | |
| 1 | 2.9 | X | | | X | |
| 2 | 1.48 | | | X | X | |
| 3 | 1 | | | | X | X |
| 4 | 0.59 | | X | | X | |
| 5 | 0.47 | | X | | | X |
| 6 | 0.36 | | X | X | | |

(X = ENGAGED CLUTCH)

$\frac{\text{RING GEAR}}{\text{SUN GEAR}}$ TOOTH RATIO: $\frac{R_1}{S_1} = 2.99$, $\frac{R_2}{S_2} = 1.53$, $\frac{R_3}{S_3} = 1.90$

| RATIO SPREAD | 7.96 |
|---|---|
| RATIO STEPS | |
| REV/1 | -0.79 |
| 1/2 | 1.96 |
| 2/3 | 1.48 |
| 3/4 | 1.69 |
| 4/5 | 1.27 |
| 5/6 | 1.28 |

| RATIOS | | 850 | 852 | 854 | 856 | 858 |
|---|---|---|---|---|---|---|
| REVERSE | -1.7 | X | | | | X |
| NEUTRAL | 0 | X | | | | |
| 1 | 2.6 | X | | | X | |
| 2 | 1.56 | | | X | X | |
| 3 | 1 | | | | X | X |
| 4 | 0.76 | | X | | X | |
| 5 | 0.55 | | X | | | X |
| 6 | 0.43 | | X | X | | |

(X = ENGAGED CLUTCH)

$\frac{\text{RING GEAR}}{\text{SUN GEAR}}$ TOOTH RATIO: $\frac{R_1}{S_1} = 1.87$, $\frac{R_2}{S_2} = 1.58$, $\frac{R_3}{S_3} = 1.60$

| RATIO SPREAD | 6.03 |
|---|---|
| RATIO STEPS | |
| REV/1 | -0.66 |
| 1/2 | 1.67 |
| 2/3 | 1.56 |
| 3/4 | 1.32 |
| 4/5 | 1.38 |
| 5/6 | 1.28 |

| RATIOS | 950 | 952 | 954 | 956 | 958 |
|---|---|---|---|---|---|
| -1.51 | | X | | | X |
| 0 | | | | | |
| 2.68 | X | | | X | |
| 1.43 | X | | | | X |
| 1 | | | X | | X |
| 0.68 | X | | X | | |
| 0.56 | | X | X | | |
| 0.46 | X | X | | | |

(X = ENGAGED CLUTCH)

$\dfrac{\text{RING GEAR}}{\text{SUN GEAR}}$ TOOTH RATIO: $\dfrac{R_1}{S_1} = 2.51$, $\dfrac{R_2}{S_2} = 1.88$, $\dfrac{R_3}{S_3} = 2.13$

| RATIO SPREAD | 5.88 |
|---|---|
| RATIO STEPS | |
| REV/1 | -0.56 |
| 1/2 | 1.88 |
| 2/3 | 1.43 |
| 3/4 | 1.47 |
| 4/5 | 1.21 |
| 5/6 | 1.23 |

| | RATIOS | 1050 | 1052 | 1054 | 1056 | 1058 |
|---|---|---|---|---|---|---|
| REVERSE | -2.31 | | | X | X | |
| NEUTRAL | 0 | | | | X | |
| 1 | 4.3 | | X | | X | |
| 2 | 3.07 | X | | | X | |
| 3 | 1.63 | X | X | | | |
| 4 | 1 | X | | | X | |
| 5 | 0.75 | | X | X | | |
| 6 | 0.54 | | | X | | X |
| 7 | 0.46 | | X | | | X |
| 8 | 0.28 | X | | | | X |

(X = ENGAGED CLUTCH)

$\dfrac{\text{RING GEAR}}{\text{SUN GEAR}}$ TOOTH RATIO: $\dfrac{R_1}{S_1} = 2.31, \dfrac{R_2}{S_2} = 1.68, \dfrac{R_3}{S_3} = 1.60$

| RATIO SPREAD | 7.97(1/6) | 9.25(1/7) | 15.5(1/8) |
|---|---|---|---|
| RATIO STEPS | | | |
| REV/1 | -0.54 | -0.54 | -0.54 |
| 1/2 | 1.4 | 1.4 | 1.4 |
| 2/3 | 1.89 | 1.89 | 1.89 |
| 3/4 | 1.63 | 1.63 | 1.63 |
| 4/5 | 1.33 | 1.33 | 1.33 |
| 5/6 | 1.39 | 1.39 | 1.39 |
| 6/7 | - | 1.16 | 1.16 |
| 7/8 | - | - | 1.67 |

| | RATIOS | 1150 | 1152 | 1154 | 1156 | 1158 |
|---|---|---|---|---|---|---|
| REVERSE | -1.85 | X | X | | | |
| NEUTRAL | 0 | X | | | | |
| 1 | 2.81 | X | | | | X |
| 2 | 1.63 | | X | | | X |
| 3 | 1 | | | | X | X |
| 4 | 0.75 | | X | | X | |
| 5 | 0.61 | | | X | X | |
| 6 | 0.51 | X | | | X | |
| 7 | 0.28 | | X | X | | |

(X = ENGAGED CLUTCH)

$\frac{\text{RING GEAR}}{\text{SUN GEAR}}$ TOOTH RATIO: $\frac{R_1}{S_1} = 1.57$, $\frac{R_2}{S_2} = 1.88$, $\frac{R_3}{S_3} = 1.85$

| RATIO SPREAD | 5.56(1/6) | 10.1(1/7) |
|---|---|---|
| RATIO STEPS | | |
| REV/1 | -0.66 | -0.66 |
| 1/2 | 1.73 | 1.73 |
| 2/3 | 1.63 | 1.63 |
| 3/4 | 1.34 | 1.34 |
| 4/5 | 1.22 | 1.22 |
| 5/6 | 1.21 | 1.21 |
| 6/7 | - | 1.82 |

# FAMILY OF MULTI-SPEED TRANSMISSION MECHANISMS HAVING THREE PLANETARY GEAR SETS AND FIVE TORQUE-TRANSMITTING MECHANISMS

BACKGROUND OF THE INVENTION

1. Field of the Invention

The present invention relates to a family of power transmissions having three planetary gear sets that are controlled by five torque-transmitting devices to provide at least six forward speed ratios and one reverse ratio.

2. Background Art

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

SUMMARY OF THE INVENTION

It is an object of the present invention to provide an improved family of transmissions having three planetary gear sets controlled to provide at least six forward speed ratios.

In one aspect of the present invention, the family of transmissions has three planetary gear sets, each of which includes a first, second and third member, which members may comprise a sun gear, a ring gear, or a planet carrier assembly member.

In another aspect of the present invention, each of the planetary gear sets may be of the single pinion-type or of the double pinion-type.

In yet another aspect of the present invention, the first member of the first planetary gear set is continuously interconnected to the first member of the second planetary gear set through a first interconnecting member.

In still another aspect of the invention, a second interconnecting member continuously interconnects the second member of the second planetary gear set with the first member of the third planetary gear set.

In yet still another aspect of the invention, a second member of the first planetary gear set is continuously connected to a stationary transmission member, such as a housing or transmission case.

In yet a further aspect of the invention, each family member incorporates an input shaft which is continuously interconnected with a member of one of the planetary gear sets and an output shaft which is continuously connected with another member of one of the planetary gear sets.

In still a further aspect of the invention, a first torque-transmitting mechanism, such as a clutch, selectively interconnects a member of the first planetary gear set with the first interconnecting member, the second interconnecting member or a member of the second or third planetary gear sets.

In another aspect of the invention, a second torque-transmitting mechanism, such as a clutch, selectively interconnects a member of the second planetary gear set with the first interconnecting member, the second interconnecting member or a member of the first or third planetary gear sets.

In a still further aspect of the invention, a third torque-transmitting member, such as a clutch, selectively interconnects a member of the third planetary gear set with the first interconnecting member, the second interconnecting member, or a member of the first or second planetary gear sets.

In a still further aspect of the invention, a fourth torque-transmitting member, such as a clutch, selectively interconnects a member of the first, second, or third planetary gear sets with another member of the first, second, or third planetary gear sets.

In still another aspect of the invention, a fifth torque-transmitting member, such as a clutch, selectively interconnects a member of the first, second, or third planetary gear sets with the input shaft, the output shaft or a member of the first, second or third planetary gear sets.

In still another aspect of the invention, the five torque-transmitting mechanisms are selectively engageable in combinations of two to yield at least six forward speed ratios and one reverse ratio.

In yet another aspect of the invention, at least one family member is controlled by the torque-transmitting mechanisms to establish eight forward speed ratios, and at least one of the family members is controlled by the torque-transmitting mechanisms to provide at least seven forward speed ratios.

The above object and other objects, features, and advantages of the present invention are readily apparent from the following detailed description of the best modes for carrying

BRIEF DESCRIPTION OF THE DRAWINGS

FIG. 1a is a schematic representation of a powertrain including a planetary transmission incorporating a family member of the present invention;

FIG. 1b is a truth table and chart of some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention; and FIG. 12b is a truth table and chart depicting some of the operating characteristics of the powertrain shown in FIG. 12a.

DESCRIPTION OF THE PREFERRED EMBODIMENT

Figures 1A, 1B:
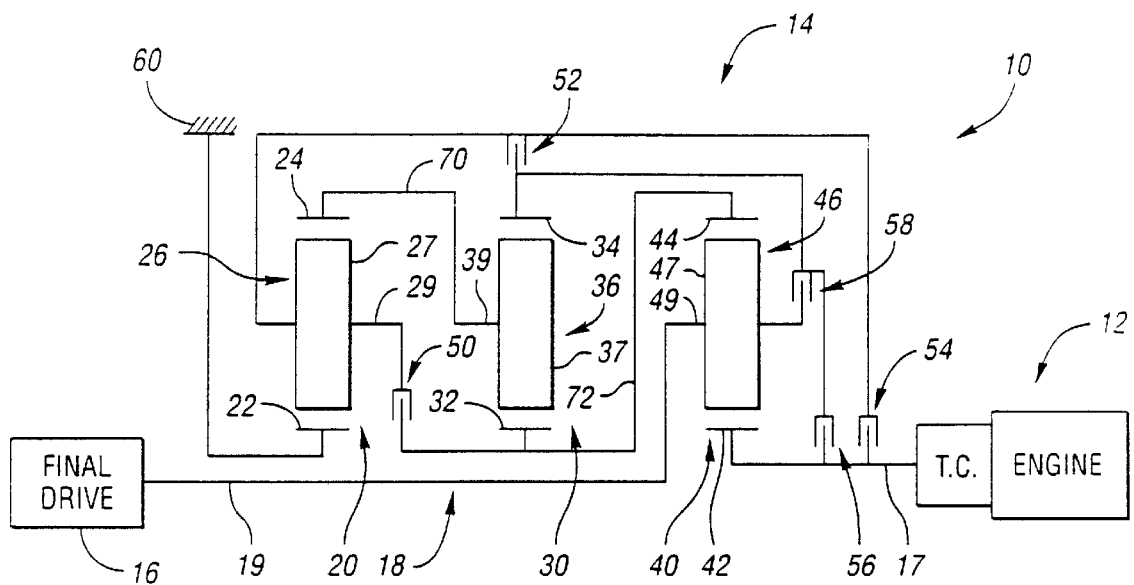

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement 18 also includes five torque transmitting mechanisms 50, 52, 54, 56 and 58. The torque transmitting mechanisms 50, 52, 54, 56 and 58 are of the rotating type torque transmitting mechanisms, commonly termed clutches.

The input shaft is continuously connected with the sun gear member 42, and the output shaft 19 is continuously connected with the planet carrier assembly member 46. A first interconnecting member 70 continuously interconnects the ring gear member 24 with the planet carrier assembly member 36.

A second interconnecting member 72 continuously interconnects the sun gear member 32 with the ring gear member 44. The sun gear member 22 is continuously connected with a transmission housing 60.

The planet carrier assembly member 26 is selectively connectable with the sun gear member 32 and the ring gear member 44 through the torque-transmitting mechanism 50, with the ring gear member 34 through the torque-transmitting mechanism 52, and with the input shaft though the torque-transmitting mechanism 54. The ring gear member 34 is selectively connectable to the input shaft 17 through the torque-transmitting mechanism 56. The planet carrier assembly member 46 is selectively connectable with the ring gear member 34 through the torque-transmitting mechanism 58.

As shown in FIG. 1*b*, and in particular the truth table disclosed therein, the torque-transmitting mechanisms are selectively engaged in combinations of two to provide six forward speed ratios and a reverse speed ratio. It should also be noted in the truth table that the torque-transmitting mechanism 52 remains engaged through a neutral condition, thereby simplifying the forward/reverse interchange.

To establish the reverse speed ratio, the torque-transmitting mechanisms 52 and 58 are engaged. The engagement of torque-transmitting mechanism 52 will hold the planet carrier assembly 26 to the ring gear member 34, and the engagement of the torque-transmitting mechanism 58 will hold the planet carrier assembly member 46 to the ring gear member 34. Accordingly, the planet carrier assembly member 26, ring gear member 34, planet carrier assembly member 46 and output shaft 19 will travel at the same speed. The planet carrier assembly member 26 will be driven at a speed determined by the speed of the ring gear member 24 and the ring gear/sun gear tooth ratio of the planetary gear set 20. The planet carrier assembly member 36 will be driven at a speed determined by the speed of the sun gear member 32, the ring gear member 34, and the ring gear/sun gear tooth ratio of the planetary gear set 30. The planet carrier assembly member 46, and therefore the output shaft 19, will be driven at a speed which is equivalent to the speed of the planet carrier assembly member 26 and ring gear member 34, the speed being determined by the speed of the input shaft 17, the speed of the ring gear member 44, and the ring gear/sun gear tooth ratio of the planetary gear set 40. The overall numerical value of the reverse ratio is determined by the tooth ratios of the planetary gear sets 20, 30 and 40.

The first forward speed ratio is established with the engagement of torque-transmitting mechanisms 50 and 52. With the torque-transmitting mechanism 50 engaged, the sun gear member 32 is fixed to the planet carrier assembly member 26. With the torque-transmitting mechanism 52 engaged, the planet carrier assembly 26 is fixed to the ring gear member 34. In this configuration, the planetary gear sets 20 and 30 are held stationary along with the ring gear 44. The output shaft 19 is therefore driven at the speed of the planet carrier assembly member 46, which is determined by the speed of the input shaft 17 and the ring gear/sun gear tooth ratio of the planetary gear set 40. The overall numerical value of the first forward speed ratio is determined by the tooth ratio of the planetary gear set 40.

The second forward speed ratio is established when the torque-transmitting mechanisms 50 and 58 are engaged. With the torque-transmitting mechanism 50 engaged, the sun gear 32 is secured to the planet carrier assembly member 26. With the torque-transmitting mechanism 58 engaged, the planet carrier assembly member 46 is secured to the ring gear member 34. The first-to-second interchange is a single transition shift. The planet carrier assembly member 26 and the sun gear member 32 are driven at a speed determined by the speed of the ring gear member 24 and the ring gear/sun gear tooth ratio of the planetary gear set 20. The planet carrier assembly member 36 is driven forwardly at a speed determined by the speed of the sun gear member 32, ring gear member 34, and the sun gear/ring gear tooth ratio of the planetary gear set 30. The planet carrier assembly member 46, and therefore the output shaft 19, is driven at a speed determined by the speed of the input shaft 17, the speed of the ring gear member 44, and the ring gear/sun gear tooth ratio of the planetary gear set 40. The overall numerical value of the second forward speed ratio is determined by the tooth ratios of planetary gear sets 20, 30 and 40.

The third forward speed ratio is established with the engagement of the torque-transmitting mechanisms 50 and 56. With the torque-transmitting mechanism 50 engaged, the sun gear member 32 rotates at the same speed as the planet carrier assembly member 26. With the torque-transmitting mechanism 56 engaged, the ring gear member 34 rotates at the same speed as the sun gear member 42 and input shaft 17. The planet carrier assembly member 26 and sun gear member 32 are driven at a speed determined by the speed of the ring gear member 24 and the ring gear/sun gear tooth ratio of the planetary gear set 20. The planet carrier assembly member 36 is driven at a speed determined by the speed of the sun gear member 32, the speed of the ring gear member 34, and the ring gear/sun gear tooth ratio of the planetary gear set 30. The planet carrier assembly member 46, and therefore the output shaft 19, are driven at a speed determined by the speed of the input shaft 17, the speed of the ring gear member 44, and the ring gear/sun gear tooth ratio of the planetary gear set 40. The overall numeric value of the third forward speed ratio is determined by the tooth ratios of the planetary gear sets 20, 30 and 40.

The fourth forward speed ratio is established with the engagement of the torque-transmitting mechanisms 50 and 54. This combination of torque-transmitting mechanism engagement provides a direct connection between the sun gear 42 and the ring gear 44. Accordingly, the planet carrier assembly member 46 rotates at the same speed as the sun gear member 42, which is directly driven by the input shaft 17. Therefore, the output shaft 19 is driven at the same speed as the input shaft 17. The numerical value of the fourth forward speed ratio is 1.

The fifth forward speed ratio is established with the engagement of the torque-transmitting mechanisms 54 and 58. With the torque-transmitting mechanism 54 engaged, the planet carrier assembly member 26 is driven at the same speed as the input shaft 17. With the torque-transmitting mechanism 58 engaged, the planet carrier assembly member 46 is driven at the same speed as the ring gear member 34. The planet carrier assembly member 26 is driven at a speed determined by the speed of the ring gear member 24 and the ring gear/sun gear tooth ratio of the planetary gear set 20. The planet carrier assembly member 36 and ring gear member 24 are driven at a speed determined by the speeds of the sun gear member 32 and ring gear member 34, and the ring gear/sun gear tooth ratio of the planetary gear set 30. The planet carrier assembly member 46, and therefore the output shaft 19, is driven at a speed determined by the speed of the input shaft 17, the speed of the ring gear member 44, and the ring gear/sun gear tooth ratio of the planetary gear set 40. The overall numeric value of the fifth forward speed ratio is determined by the ring gear/sun gear tooth ratios of the planetary gear sets 20, 30 and 40.

The sixth forward speed ratio is established with the engagement of the torque-transmitting mechanisms 52 and 54. With the torque-transmitting mechanism 52 engaged, the planet carrier assembly member 26 rotates at the same speed as the ring gear member 34. With the torque-transmitting mechanism 54 engaged, the planet carrier assembly member 26 rotates at the same speed as the input shaft. During the sixth forward speed ratio, the planet carrier assembly member 26 rotates at a speed determined by the speed of the ring gear member 24 and the ring gear/sun gear tooth ratio of the planetary gear set 20. The planet carrier assembly member 36 rotates at a speed determined by the speed of the sun gear member 32, the speed of the ring gear member 34, and the ring gear/sun gear tooth ratio of the planetary gear set 30. The planet carrier assembly member 46, and therefore the output shaft 19, rotates at a speed determined by the speed of the input shaft 17, the speed of the ring gear member 44, and the ring gear/sun gear tooth ratio of the planetary gear set 40. The overall numeric value of the sixth forward speed ratio is determined by the tooth ratios of the planetary gear sets 20, 30 and 40.

As set forth above, the engagement schedules for the torque-transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between the first and second forward ratios is 1.73, while the step ratio between the reverse and first forward ratio is 0.52. It can also be readily determined from the truth table of FIG. 1b that all of the single step forward ratio interchanges are of the single transition variety.

Figures 2A, 2B:
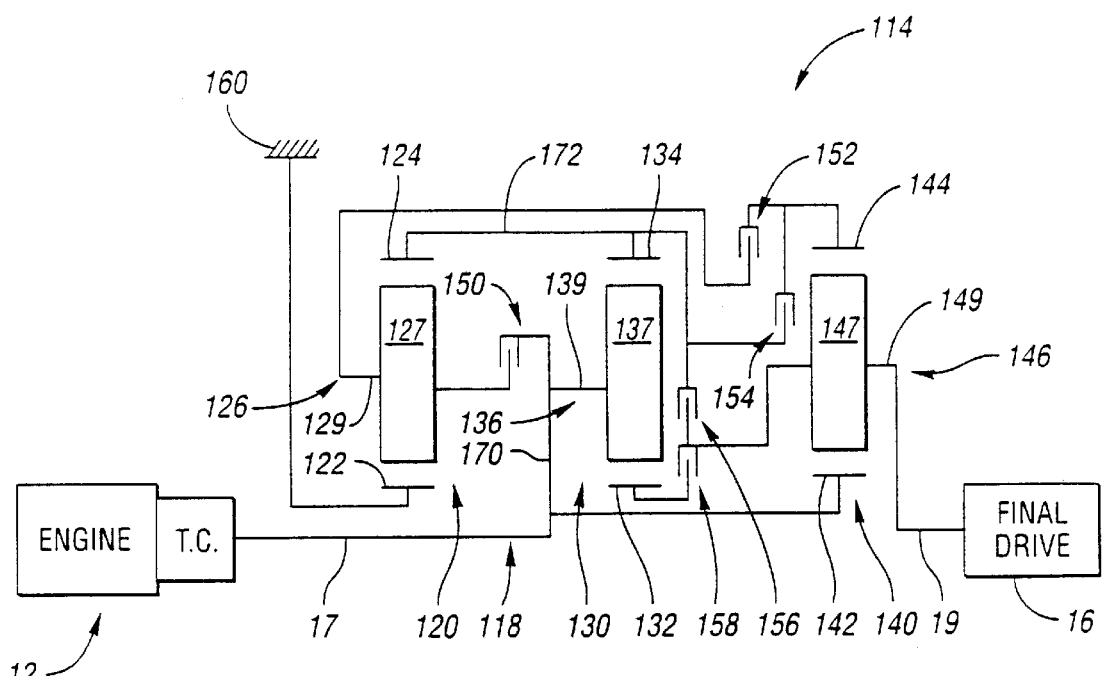

FIG. 2a shows a powertrain having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes five torque transmitting mechanisms 150, 152, 154, 156 and 158. The torque transmitting mechanisms 150, 152, 154, 156 and 158 are of the rotating type torque transmitting mechanisms, commonly termed clutches.

The input shaft 17 is continuously connected with the sun gear member 142, and the output shaft 19 is continuously connected with the planet carrier assembly member 146. The sun gear member 122 is continuously connected with the transmission housing 160. The sun gear member 142 and planet carrier assembly member 136 are continuously connected by the interconnecting member 170. The ring gear member 134 and ring gear member 124 are continuously connected by the interconnecting member 172.

The planet carrier assembly member 126 is selectively connectable with the planet carrier assembly member 136 through the torque transmitting mechanism 150. The planet carrier assembly member 126 is selectively connectable with the ring gear member 144 through the torque transmitting mechanism 152. The ring gear member 134 is selectively connectable with the ring gear member 144 through the torque transmitting mechanism 154. The ring gear member 134 is selectively connectable with the planet carrier assembly member 146 through the torque transmitting mechanism 156. The sun gear member 132 is selectively connectable with the planet carrier assembly member 146 through the torque transmitting mechanism 158.

The truth table of FIG. 2b describes the engagement sequence utilized to provide six forward speed ratios and a reverse speed ratio in the planetary gear arrangement 118 shown in FIG. 2a.

To establish the reverse speed ratio, the torque transmitting mechanisms 150 and 158 are engaged. With torque transmitting mechanism 150 engaged, the planet carrier assembly member 126 is engaged with the planet carrier assembly member 136. With the torque transmitting member 158 engaged, the sun gear member 132 is engaged with the planet carrier assembly member 146.

The planet carrier assembly member 126 is driven at a speed determined by the speed of the ring gear member 124 and the ring gear/sun gear tooth ratio of the planetary gear set 120. The planet carrier assembly member 136 is driven at a speed which is the same as that of the planet carrier assembly member 126, and is determined by the speed of the sun gear member 132, the speed of the ring gear member 134, and the ring gear/sun gear tooth ratio of the planetary gear set 130. The output shaft 19 is driven at a reverse speed corresponding with the speed of the planet carrier assembly member 146 and sun gear member 132. The overall numerical value of the reverse speed ratio is determined by the tooth ratios of the planetary gear sets 120 and 130.

The first forward speed ratio is established with the engagement of the torque transmitting mechanisms 152 and 154. The torque transmitting mechanism 152 connects the ring gear 144 with the planet carrier assembly member 126. The torque transmitting mechanism 154 connects the ring gear 134 with the ring gear 144. This configuration creates a lock-up in the first planetary gear set 120. The planet carrier assembly member 136 rotates at the same speed as the input shaft 17. The planet carrier assembly member 146, and therefore the output shaft 19, rotates at a speed determined by the speed of the sun gear member 142 and the ring gear/sun gear ratio of the planetary gear set 140. The overall numerical value of the first forward speed is determined by the tooth ratio of the planetary gear set 140.

The second forward speed ratio is established with the engagement of the torque transmitting mechanisms 152 and 156. The torque transmitting mechanism 152 connects the ring gear member 144 with the planet carrier assembly member 126, and the torque transmitting mechanism 156 connects the ring gear member 134 with the planet carrier assembly member 146. The planet carrier assembly member 126 rotates at a speed determined by the speed of the ring gear member 124 and the ring gear/sun gear tooth ratio of the planetary gear set 120. The planet carrier assembly member 136 rotates at the same speed as the input shaft. The planet carrier assembly member 146, and therefore the output shaft 19, rotates at a speed determined by the speed of the ring gear member 144, the speed of the sun gear member 142, and the ring gear/sun gear tooth ratio of the planetary gear set 140. The overall numerical value of the second forward speed ratio is determined by the tooth ratios of the planetary gear sets 120 and 140.

The third forward speed ratio is established with the engagement of the torque transmitting mechanisms 152 and 158. The torque transmitting mechanism 152 connects the ring gear 144 with the planet carrier assembly member 126, and the torque transmitting mechanism 158 connects the planet carrier assembly member 146 with the sun gear member 132. In this configuration, the planet carrier assembly member 126 is rotated at a speed determined by the speed of the ring gear member 124 and the ring gear/sun gear tooth ratio of the planetary gear set 120. The planet carrier assembly member 136 is driven at the same speed as the input shaft 17. The ring gear member 134, and therefore ring gear member 124, is driven at a speed determined by the speed of the planet carrier assembly member 136, the speed of the sun gear member 132, and the ring gear/sun gear tooth ratio of planetary gear set 130. The planet carrier assembly member 146, and therefore the output shaft 19, is driven at a speed determined by the speed of the input shaft 17, the speed of the ring gear member 144, and the ring gear/sun gear tooth ratio of the planetary gear set 140. The overall numerical value of the third forward speed ratio is determined by the tooth ratios of the planetary gear sets 120, 130 and 140.

The fourth forward speed ratio is established with the engagement of the torque transmitting mechanisms 154 and 158. This combination of engagements effectively connects the input shaft 17 directly with the output shaft 19 such that the fourth forward speed ratio is a direct drive or 1:1 ratio.

The fifth forward speed ratio is established with the engagement of the torque transmitting mechanisms 150 and 154. The torque transmitting mechanism 150 connects the planet carrier assembly member 126 with the planet carrier assembly member 136, and the torque transmitting mechanism 154 connects the ring gear member 134 with the ring gear member 144. In this configuration, the planet carrier assembly members 126 and 136 rotate at the same speed as the input shaft. The ring gear members 124, 134 and 144 all rotate at the same speed. The ring gear member 124 rotates at a speed determined by the speed of the planet carrier assembly member 126 and the ring gear/sun gear tooth ratio of the planetary gear set 120. The planet carrier assembly member 146, and therefore the output shaft 19, rotates at a speed determined by the speed of the ring gear member 144, the input shaft speed 17, and the ring gear/sun gear tooth ratio of the planetary gear set 140. The overall numerical value of the fifth forward speed ratio is determined by the tooth ratios of the planetary gear sets 120 and 140.

The sixth forward speed ratio is established with the engagement of the torque transmitting mechanisms 150 and 156. In this configuration, the planet carrier assembly member 126 and planet carrier assembly member 136 rotate at the same speed as the input shaft 17. The planet carrier assembly member 146 rotates at the same speed as the ring gear member 124 and ring gear member 134. The speed of the output shaft is the same as the speed of the planet carrier assembly member 146. The overall numerical value of the sixth forward speed ratio is determined by the tooth ratio of the planetary gear set 120.

As set forth above, the truth table of FIG. 2b describes the engagement sequence of the torque transmitting mechanisms utilized to provide a reverse drive ratio and six forward speed ratios. It can be readily determined from the truth table that all the single step forward interchanges are of the single transition type. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2b are the ratio steps between single step ratios in the forward direction as well as the reverse to first ratio step. For example, the first to second step ratio is 1.73.

Figures 3A, 3B:
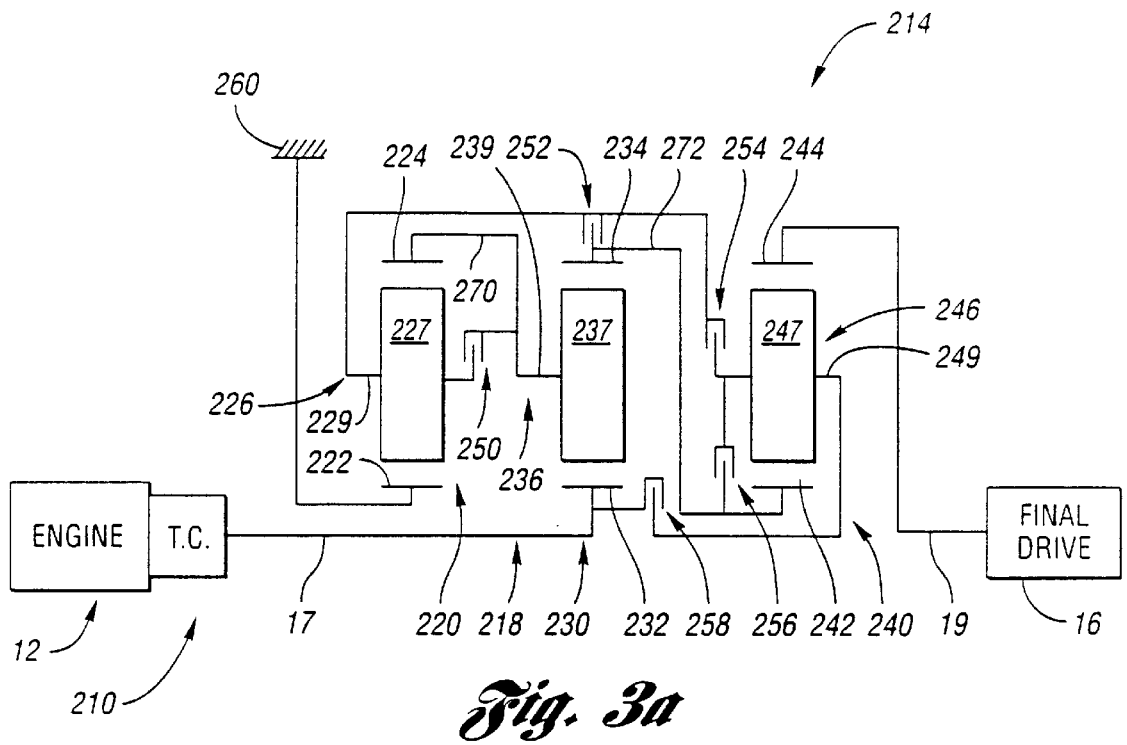

Turning to FIG. 3a, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes five torque transmitting mechanisms 250, 252, 254, 256 and 258. The torque transmitting mechanisms 250, 252, 254, 256 and 258 are of the rotating type torque transmitting mechanisms, commonly termed clutches.

The input shaft 17 is continuously connected with the sun gear member 232, and the output shaft 19 is continuously connected with the ring gear member 244. The sun gear member 222 is continuously connected with the transmission housing 260. The ring gear member 224 and planet carrier assembly member 236 are continuously interconnected through an interconnecting member 270, which is selectively connectable with the planet carrier assembly member 226 through the torque transmitting mechanism 250. The ring gear member 234 is continuously connected with the sun gear member 242 by an interconnecting member 272, which is selectively connectable with the planet carrier assembly member 246 through the torque transmitting mechanism 256.

The planet carrier assembly member 226 is selectively connectable with the ring gear member 234 through the torque transmitting mechanism 252, and with the planet carrier assembly member 246 through the torque transmitting mechanism 254. The sun gear member 232 is selectively connectable with the planet carrier assembly member 246 through the torque transmitting member 258.

As shown in the truth table in FIG. 3b, the torque transmitting mechanisms are engaged in combinations of two to establish six forward speed ratios and one reverse ratio. It should be also noted that the torque transmitting mechanism 250 can remain engaged through the neutral condition, thereby simplifying the forward/reverse interchange.

To establish the reverse speed ratio, the torque transmitting mechanisms 250 and 256 are engaged. In this configuration, the planet carrier assembly member 226 is secured to the planet carrier assembly member 236, and the planet carrier assembly member 246 is secured to the sun gear member 242. The planetary gear set 220 is locked to the transmission housing 260. The planetary gear set 240 is rotated as one unit. Thus, all the members of planetary gear set 240 rotate at the same speed as the output shaft. Further, the planet carrier assembly member 236 is also fixed to the transmission housing 260. The ring gear member 234, and therefore the output shaft 19, rotate in reverse at a speed determined by the speed of the sun gear member 232 and the ring gear/sun gear tooth ratio of the planetary gear set 230. The overall numerical value of the reverse speed ratio is determined by the ring gear/sun gear tooth ratio of the planetary gear set 230.

To establish the first forward speed ratio, the torque transmitting mechanisms 250 and 254 are engaged. In this configuration, the ring gear member 224 and the planet carrier assembly member 226 are secured to the planet carrier assembly member 246, and the planet carrier assembly member 226 is also secured to the planet carrier assembly member 236. Accordingly, the planetary gear set 220 is locked to the transmission housing 260 and the three planet carrier assembly members 226, 236 and 246 and the ring gear member 224 are fixed to the transmission housing 260. The ring gear member 234 is driven at a speed determined by the speed of the input shaft 17, and the sun gear/ring gear tooth ratio of the planetary gear set 230. The ring gear 244, and therefore the output shaft 19, is driven at a speed determined by the speed of the sun gear 242 and the ring gear/sun gear tooth ratio of the planetary gear set 240. The overall numerical value of the first forward speed ratio is determined by the tooth ratios of the planetary gear sets 230 and 240.

The second forward speed ratio is established with the engagement of the torque transmitting mechanisms 254 and 256. In this configuration, the planet carrier assembly member 226 is connected to the planet carrier assembly member 246, and the planet carrier assembly member 246 is connected to the sun gear member 242. The planetary gear set 240 is locked and rotated at the same speed as the output shaft. The planet carrier assembly member 226 is driven at a speed determined by the speed of the ring gear member 224 and the ring gear/sun gear tooth ratio of the planetary gear set 220. The planet carrier assembly member 2 36 is driven at a speed determined by the speed of the input shaft 17, the speed of the ring gear 234, and the ring gear/sun gear tooth ratio of the planetary gear set 230. The overall numerical value of the second forward speed ratio is determined by the tooth ratios of the planetary gear sets 220 and 230.

The third forward speed ratio is established with the engagement of the torque transmitting mechanisms 254 and 258. In this configuration, the planet carrier assembly member 226 is connected to the planet carrier assembly member 246, and the planet carrier assembly member 246 is connected to the sun gear member 232. Accordingly, the sun gear member 232 and planet carrier assembly members 226 and 246 are driven at the same speed as the input shaft. The planet carrier assembly member 226 is driven at a speed determined by the speed of the ring gear member 224 and the ring gear/sun gear tooth ratio of the planetary gear set 220. The planet carrier assembly member 236 is driven at a speed determined by the input shaft speed, the speed of the ring gear member 234, and the ring gear/sun gear tooth ratio of the planetary gear set 230. The ring gear member 244, and therefore the output shaft 19, is driven at a speed determined by the speed of the sun gear member 242, the speed of the planet carrier assembly member 246, and the ring gear/sun gear tooth ratio of the planetary gear set 240. The overall numerical value of the third forward speed ratio is determined by the tooth ratios of the planetary gear sets 220, 230 and 240.

The fourth forward speed ratio is established with the engagement of the torque transmitting mechanisms 256 and 258. With this combination of engagements, the input shaft 17 and the output shaft 19 rotate in unison and therefore the fourth forward speed ratio is a direct drive or 1:1 ratio.

The fifth forward speed ratio is established with the engagement of the torque transmitting mechanisms 252 and 258. In this configuration, the planet carrier assembly member 226 is driven at the same speed as the ring gear member 234, and the planet carrier assembly member 246 is driven at the same speed as the sun gear member 232, which is the same speed as the input shaft 17. The planet carrier assembly member 226 is driven at a speed which is determined by the speed of the ring gear member 224 and the ring gear/sun gear tooth ratio of the planetary gear set 220. The planet carrier assembly member 236 is driven at a speed determined by the speed of the ring gear member 234, the speed of the input shaft 17, and the ring gear/sun gear tooth ratio of the planetary gear set 230. The ring gear member 244, and therefore the output shaft 19, is driven at a speed determined by the speed of the sun gear member 242, the speed of the planet carrier assembly member 246, and the ring gear/sun gear tooth ratio of the planetary gear set 240. The overall numerical value of the fifth forward speed ratio is determined by the tooth ratios of all three planetary gear sets 220, 230 and 240.

The sixth forward speed ratio is established with the engagement of the torque transmitting mechanisms 250 and 258. In this configuration, the torque transmitting mechanism 250 connects the planet carrier assembly member 226 with the planet carrier assembly member 236, and the torque transmitting mechanism 258 connects the input shaft 17 and sun gear member 232 with the planet carrier assembly member 246. The planetary gear set 220 is locked to the transmission housing 260, along with the planet carrier assembly member 236. The speed of the ring gear member 234 is determined by the speed of the input shaft 17, and the ring gear/sun gear tooth ratio of the planetary gear set 230. The speed of the ring gear member 244, and therefore the speed of the output shaft 19, is determined by the speed of the sun gear member 242, the speed of the planet carrier assembly member 246, and the ring gear/sun gear tooth ratio of the planetary gear set 240. The overall numerical value of the sixth forward speed ratio is determined by the ring gear/sun gear tooth ratios of the planetary gear sets 230 and 240.

As previously set forth, the truth table of FIG. 3b describes the combinations of engagements utilized for the six forward speed ratios and reverse ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse speed ratio. For example, the first to second ratio interchange has a step of 1.62. It can also be readily determined from the truth table of FIG. 3b that all of the single step forward ratio interchanges are of the single transition variety, as are all of the double step forward interchanges.

Figures 4A, 4B:
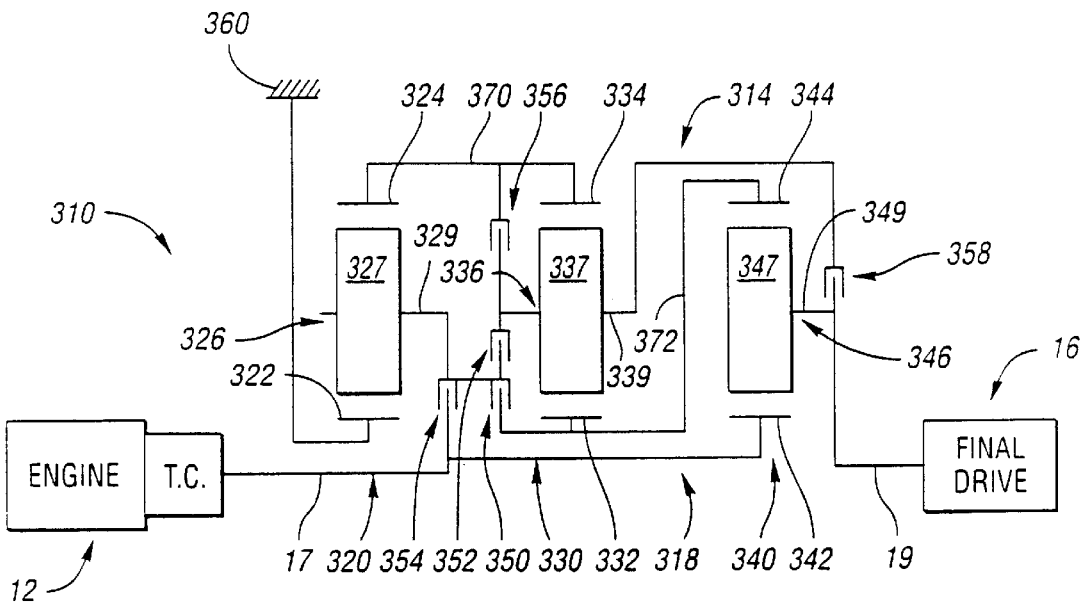

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes five torque transmitting mechanisms 350, 352, 354, 356 and 358. The torque transmitting mechanisms 350, 352, 354, 356 and 358 are of the rotating type torque transmitting mechanisms, commonly termed clutches.

The input shaft 17 is continuously connected with the sun gear member 342, the output shaft 19 is continuously connected with the planet carrier assembly member 346, and the sun gear member 322 is continuously connected with the transmission housing 360. The ring gear member 324 is continuously connected with ring gear member 334 by an interconnecting member 370. The sun gear member 332 is continuously connected with the ring gear member 344 by an interconnecting member 372.

The planet carrier assembly member 326 is selectively connectable with the sun gear member 332 through the torque transmitting mechanism 350. The planet carrier assembly member 326 is selectively connectable with the planet carrier assembly member 336 through the torque transmitting mechanism 352. The input shaft 17 is selectively connectable with the planet carrier assembly member 326 through the torque transmitting mechanism 354.

The planet carrier assembly member 336 is selectively connectable with the interconnecting member 370 through the torque transmitting mechanism 356. The planet carrier assembly member 346 is selectively connectable with the planet carrier assembly member 336 through the torque transmitting mechanism 358.

The truth tables given in FIGS. 4b, 5b, 6b, 7b, 8b, 9b, 10b, 11b and 12b show the engagement sequence for the torque transmitting mechanisms to provide at least six forward speed ratios and one reverse ratio. As shown for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and the engagement sequence necessary to provide the reverse drive ratio and the six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.62. It can be readily determined from the truth table of FIG. 4b that each of the forward single step ratio interchanges is a single transition shift. The chart also shows that the torque transmitting mechanism 352 can be engaged through the neutral condition to simplify the forward/reverse interchange.

Those skilled in the art will recognize that the numerical value of the reverse speed ratio is determined utilizing the ring gear/sun gear tooth ratios of all three planetary gear sets 320, 330 and 340. The numerical value of the first, third and sixth forward speed ratios are determined utilizing the ring gear/sun gear tooth ratio of all three planetary gear sets 320, 330 and 340. The numerical value of the second forward speed ratio is determined utilizing the ring gear/sun gear tooth ratio of the planetary gear set 340. The fourth forward speed ratio is a 1:1 or direct drive. The numerical value of the fifth forward speed ratio is determined utilizing the tooth ratios of the planetary gear sets 320 and 340.

Figures 5A, 5B:
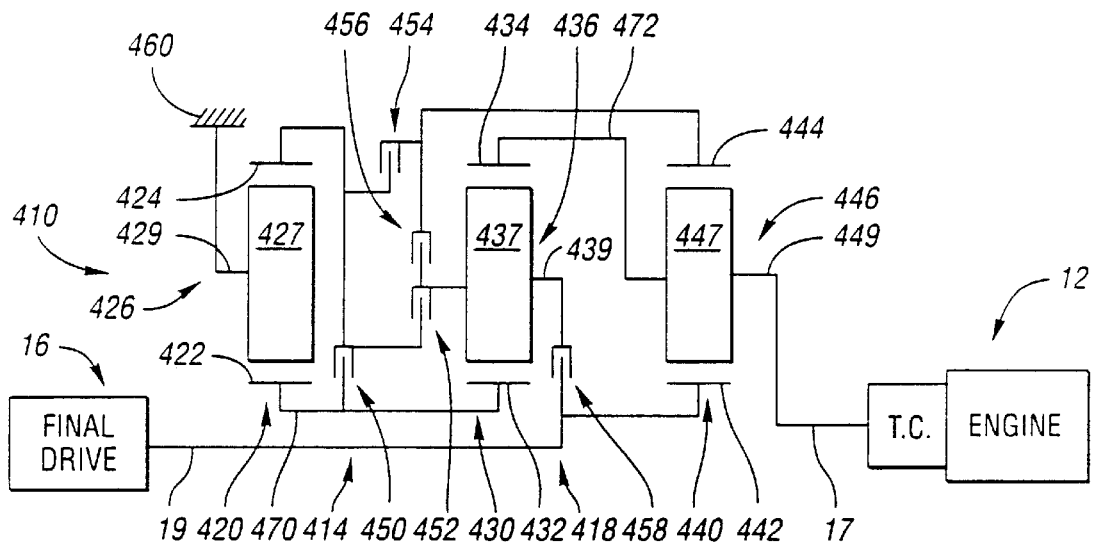

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes five torque transmitting mechanisms 450, 452, 454, 456 and 458. The torque transmitting mechanisms 450, 452, 454, 456 and 458 are of the rotating type torque transmitting mechanisms, commonly termed clutches.

The input shaft 17 is continuously connected with the planet carrier assembly member 446, the output shaft 19 is continuously connected with the sun gear member 442, and the planet carrier assembly member 426 is continuously connected with the transmission housing 460. The sun gear member 422 is continuously connected with sun gear member 432 by interconnecting member 470, and the ring gear member 434 is continuously connected with the planet carrier assembly member 446 by the interconnecting member 472.

The sun gear member 422 is selectively connectable with the ring gear member 424 through the torque transmitting mechanism 450. The planet carrier assembly member 436 is selectively connectable with the ring gear member 424 through the torque transmitting mechanism 452.

The ring gear member 424 is selectively connectable with the ring gear member 444 through the torque transmitting mechanism 454. The planet carrier assembly member 436 is selectively connectable with the ring gear member 444 through the torque transmitting mechanism 456. The planet carrier assembly member 436 is selectively connectable with the sun gear member 442 through the torque transmitting mechanism 458.

The truth table shown in FIG. 5b describes the engagement combination and sequence of the torque transmitting mechanisms 450, 452, 454, 456 and 458 that are employed to provide the reverse drive ratio and the six forward speed ratios. It should be noted that the torque transmitting mechanism 458 is engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5b, the single step forward interchanges are single transition shifts, as are the double step interchanges in the forward direction.

FIG. 5b also provides a chart of the ratio steps between adjacent forward ratios and between the reverse and first forward ratio. For example, the ratio step between the first and second forward ratios is 1.66. Those skilled in the art will recognize that the numerical value of the reverse speed ratio is determined utilizing the tooth ratios of all three planetary gear sets 420, 430 and 440. The numerical value of the first forward speed ratio is determined utilizing the ring gear/sun gear tooth ratio of the planetary gear sets 420 and 430. The numerical value of the second forward speed ratio is determined utilizing the tooth ratio of the planetary gear set 430. The third forward speed ratio is 1:1 or direct drive ratio. The numerical value of the fourth forward speed ratio is determined utilizing the ring gear/sun gear tooth ratios of the planetary gear sets 430 and 440. The numerical value of the fifth forward speed ratio is determined utilizing the ring gear/sun gear tooth ratios of all three planetary gear sets 420, 430 and 440. The numerical value of the sixth forward speed ratio is determined utilizing the tooth ratio of the planetary gear set 440.

Figures 6A, 6B:
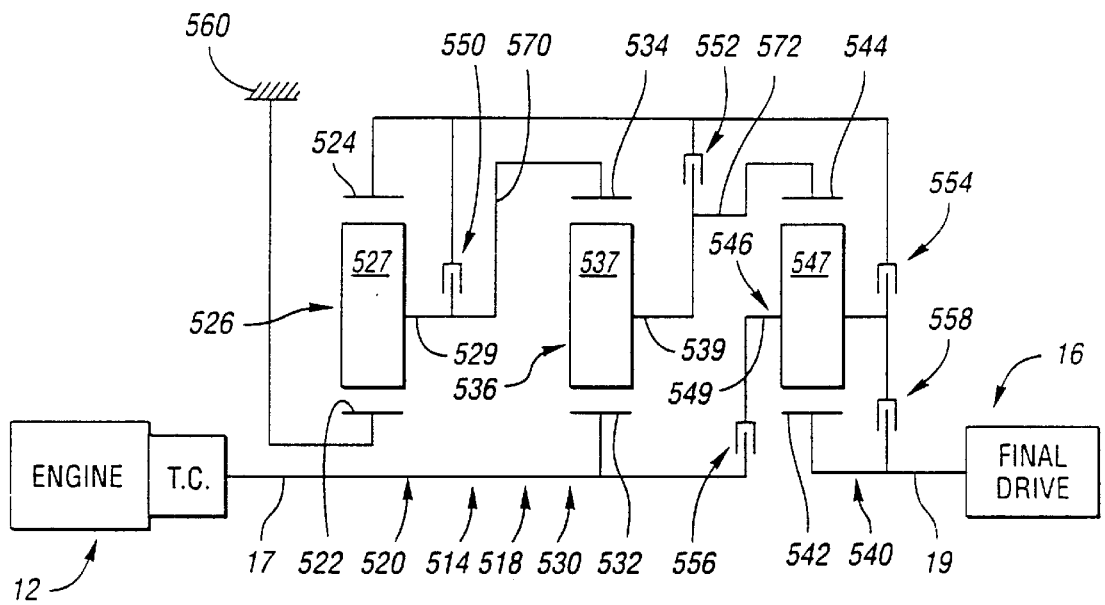

A powertrain 510, shown in FIG. 6a, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes five torque transmitting mechanisms 550, 552, 554, 556 and 558. The torque transmitting mechanisms 550, 552, 554, 556 and 558 are of the rotating type torque transmitting mechanisms, commonly termed clutches.

The input shaft is continuously connected with the sun gear member 532, the output shaft is continuously connected with the sun gear member 542, and sun gear member 522 is continuously connected with the transmission housing 560. The planet carrier assembly member 526 is continuously connected with the ring gear member 536 to the interconnecting member 570. The planet carrier assembly member 536 is continuously connected with the ring gear member 544 through the interconnecting member 572.

The ring gear member 524 is selectively connectable with the planet carrier assembly member 526 through the torque transmitting mechanism 550. The ring gear member 524 is selectively connectable with the interconnecting member 572 through the torque transmitting mechanism 552. The planet carrier assembly member 546 is selectively connectable with the ring gear member 524 through the torque transmitting mechanism 554. The planet carrier assembly member 546 is selectively connectable with the sun gear member 532 through the torque transmitting mechanism 556. The sun gear member 542 is selectively connectable with the planet carrier assembly member 546 through the torque transmitting mechanism 558.

The truth table shown in FIG. 6b describes the engagement sequence and combination of the torque transmitting mechanisms to provide the reverse speed ratio and six forward speed ratios. It should be noted that the torque transmitting mechanism 550 can remain engaged through the neutral condition, thereby simplifying the forward/reverse interchange. It can also be determined from the truth table of FIG. 6b that all of the single step forward ratio interchanges are of the single transition variety, as are all of the double step forward interchanges. The chart of FIG. 6b describes the ratio steps between adjacent forward speed ratios and the ratio step between the reverse and first forward speed ratio.

Those skilled in the art, upon reviewing the truth table and the schematic representation of FIG. 6a, can determine that the numerical value of the reverse speed ratio is determined by the ring gear/sun gear tooth ratio of the planetary gear sets 530 and 540. The numerical value of the first forward speed ratio is determined by the tooth ratio of the planetary gear set 530. The numerical value of the second forward speed ratio is determined by the tooth ratios of the planetary gear sets 520 and 530. The third forward speed ratio is a 1:1 or direct drive connection. The fourth and fifth forward speed ratios are determined by the tooth ratios of all three planetary gear sets 520, 530 and 540. The sixth forward speed ratio is determined by the tooth ratios of the planetary gear sets 530 and 540.

The sample speed ratios given in the truth table are determined utilizing the tooth ratio values also given in FIG. 6b. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
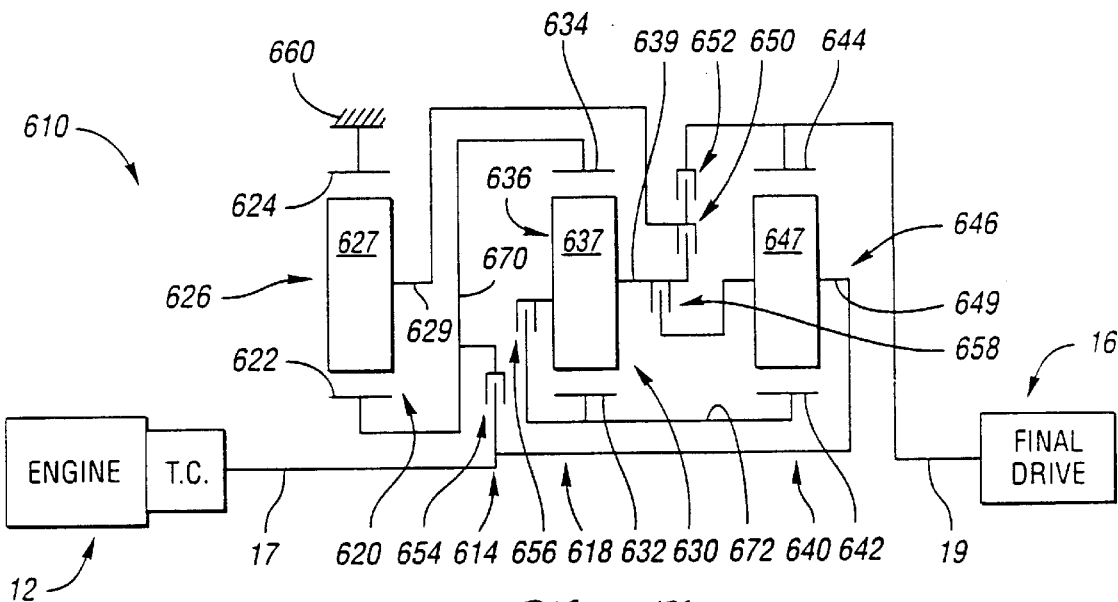

A powertrain 610, shown in FIG. 7a, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes five torque transmitting mechanisms 650, 652, 654, 656 and 658. The torque transmitting mechanisms 650, 652, 654, 656 and 658 are of the rotating type torque transmitting mechanisms, commonly termed clutches.

The input shaft 17 is continuously connected with the planet carrier assembly member 646, the output shaft 19 is continuously connected with the ring gear member 644, and the ring gear member 624 is continuously connected with the transmission housing 660. The sun gear member 622 and ring gear member 634 are continuously connected by the interconnecting member 670. The sun gear member 632 and sun gear member 642 are continuously connected by the interconnecting member 672.

The planet carrier assembly member 626 is selectively connectable with the planet carrier assembly member 636 through the torque transmitting mechanism 650. The planet carrier assembly member 626 is selectively connectable with the ring gear member 644 through the torque transmitting mechanism 652. The planet carrier assembly member 646 and the input shaft 17 are selectively connectable with the interconnecting member 670 through the torque transmitting mechanism 654. The sun gear member 632 is selectively connectable with the planet carrier assembly member 636 through the torque transmitting mechanism 656. The planet carrier assembly member 636 is selectively connectable with the planet carrier assembly member 646 through the torque transmitting mechanism 658.

The truth table shown in FIG. 7b describes the combination of torque transmitting mechanism engagements that will provide the reverse drive ratio and the six forward speed ratios, as well as the sequence of these engagements and interchanges. The torque transmitting mechanism 652 can be engaged through the neutral condition, thereby simplifying the forward/reverse interchange. It can be noted from the truth table that each of the single step forward interchanges are single transition ratio changes, and the double step forward interchanges are also single transition ratio changes.

The ratio values given are by way of example and are established utilizing the ring gear/sun gear tooth ratios given in FIG. 7b. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Those skilled in the art will, upon reviewing the truth table of FIG. 7b, recognize that the reverse ratio has a numerical value determined by the tooth ratios of the planetary gear sets 620, 630 and 640. The numerical value of the first forward speed ratio is determined by the ring gear/sun gear tooth ratio of the planetary gear set 620. The numerical value of the second forward speed ratio is determined by the tooth ratios of the planetary gear sets 620 and 640. The numerical value of the third forward speed ratio is 1:1 or a direct drive connection. The numerical value of the fourth forward speed ratio is determined by the tooth ratio of the planetary gear set 640. The numerical value of the fifth and sixth forward speed ratios are determined utilizing the tooth ratios of the planetary gear sets 620, 630 and 640.

Figures 8A, 8B:
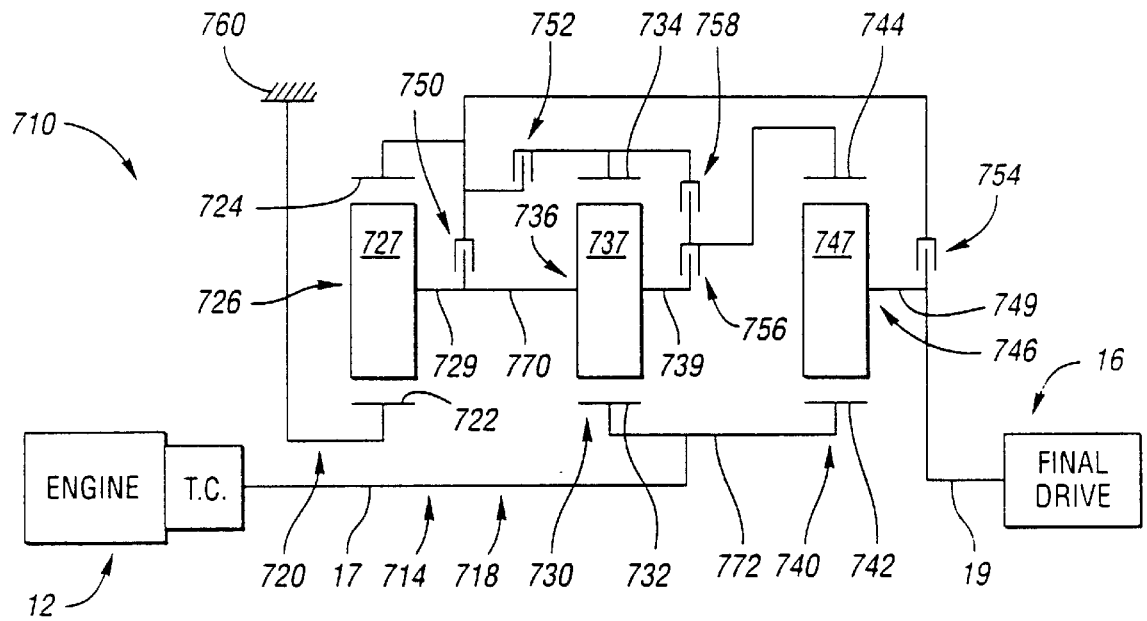

A powertrain 710, shown in FIG. 8a, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes five torque transmitting mechanisms 750, 752, 754, 756 and 758. The torque transmitting mechanisms 750, 752, 754, 756 and 758 are of the rotating type torque transmitting mechanisms, commonly termed clutches.

The input shaft 17 is continuously connected with the sun gear member 742, the output shaft 19 is continuously connected with the planet carrier assembly member 746, and the sun gear member 722 is continuously connected with the transmission housing 760. The planet carrier assembly member 726 is continuously connected with the planet carrier assembly member 736 through the interconnecting member 770. The sun gear member 732 is continuously connected with the sun gear member 742 through the interconnecting member 772.

The planet carrier assembly member 726 is selectively connectable with the ring gear member 724 through the torque transmitting mechanism 750. The ring gear member 724 is selectively connectable with the ring gear member 734 through the torque transmitting mechanism 752. The planet carrier assembly member 746 is selectively connectable with the ring gear member 724 through the torque transmitting mechanism 754. The planet carrier assembly member 736 is selectively connectable with the ring gear member 744 through the torque transmitting mechanism 756. The ring gear member 734 is selectively connectable with the ring gear member 744 through the torque transmitting mechanism 758.

The truth table of FIG. 8b defines the torque transmitting mechanism engagement sequence utilized for each of the forward speed ratios and the reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740. As can also be determined from the truth table of FIG. 8b, the single step forward interchanges are single transition shifts, as are the double step interchanges in the forward direction, except for the reverse to first interchange.

FIG. 8b also provides a chart of the ratio steps between adjacent forward ratios and between the reverse and first forward ratio. For example, the ratio step between the first and second forward ratios is 1.96. Those skilled in the art will recognize that the numerical value of the reverse speed ratio is determined utilizing the tooth ratios of all three planetary gear sets 720, 730 and 740. The first forward speed ratio is determined utilizing the ring gear/sun gear tooth ratio of the planetary gear set 740. The second forward speed ratio is determined utilizing the tooth ratios of the planetary gear sets 720 and 740. The third forward speed ratio is a 1:1 or direct drive ratio. The fourth and fifth speed ratios both have numerical values determined utilizing the tooth ratios of all three planetary gear sets 720, 730 and 740. The sixth forward speed ratio has a numerical value determined utilizing the tooth ratios of the planetary gear sets 720 and 730.

Figures 9A, 9B:
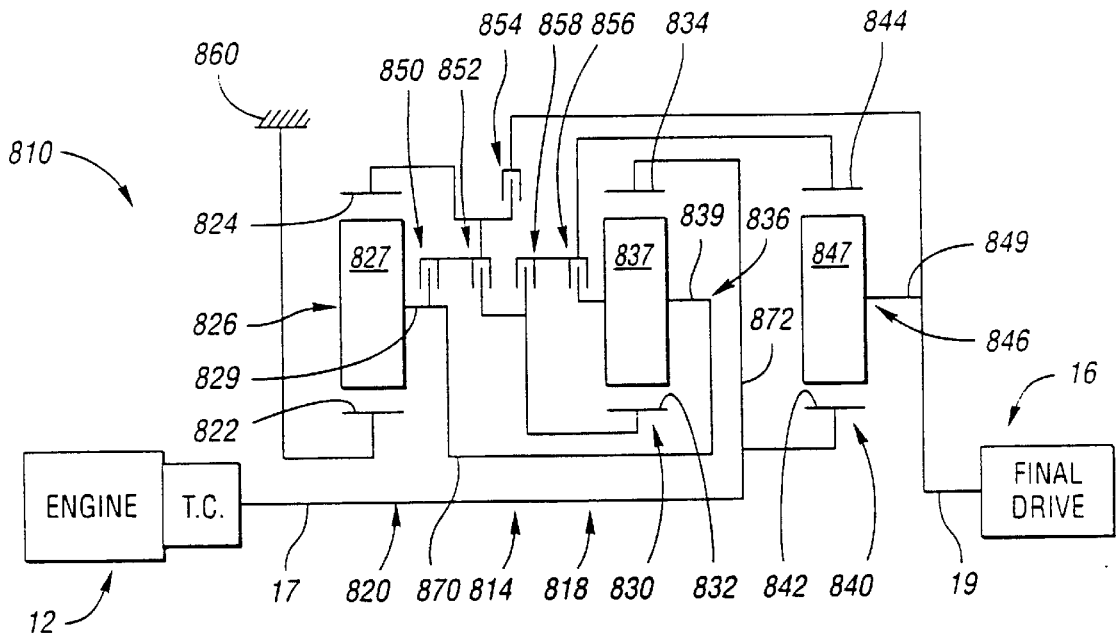

A powertrain 810, shown in FIG. 9a, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear arrangement 818 also includes five torque transmitting mechanisms 850, 852, 854, 856 and 858. The torque transmitting mechanisms 850, 852, 854, 856 and 858 are of the rotating type torque transmitting mechanisms, commonly termed clutches.

The input shaft 17 is continuously connected with the sun gear member 842, the planet carrier assembly member 846 is continuously connected with the output shaft 19, and the sun gear member 822 is continuously connected with the transmission housing 860. The planet carrier assembly member 826 is continuously connected with the planet carrier assembly member 836 through the interconnecting member 870. The sun gear member 840 is continuously connected with the ring gear member 834 through the interconnecting member 872.

The planet carrier assembly member 826 is selectively connectable with the ring gear member 824 through the torque transmitting mechanism 850. The ring gear member 824 is selectively connectable with the sun gear member 832 through the torque transmitting member 852. The ring gear member 824 is selectively connectable with the planet carrier assembly member 846 through the torque transmitting mechanism 854. The planet carrier assembly member 836 is selectively connectable with the ring gear member 844 through the torque transmitting mechanism 856. The sun gear member 832 is selectively connectable with the ring gear member 844 through the torque transmitting mechanism 858.

The truth table shown in FIG. 9b defines the torque transmitting mechanism engagement sequence that provides the reverse ratio and six forward speed ratios shown in the truth table and available with the planetary gear arrangement 818. The truth table indicates that the torque transmitting mechanism 850 can remain engaged through the neutral condition, thereby simplifying the forward/reverse interchange. A sample of numerical values for the individual ratios is also given in the truth table of FIG. 9b. These numerical values have been calculated utilizing the ring gear/sun gear tooth ratios also given by way of example in FIG. 9b. The R1/S1 value is the tooth ratio of the planetary gear set 820; the R1/S2 value is the tooth ratio of the planetary gear set 830; and the R3/S3 value is the tooth ratio of the planetary gear set 840. It can be readily recognized from the truth table that all of the single and double step forward interchanges are single transition ratio interchanges. FIG. 9b also describes the ratio steps between adjacent forward ratios and between the reverse and first forward ratio. For example, the ratio step between the first and second forward ratios is 1.67.

Those skilled in the art of planetary transmissions will recognize that the numerical value of the reverse speed ratio is determined by the tooth ratios of the planetary gear sets 830 and 840. The numerical value of the first forward speed ratio is determined by the tooth ratio of the planetary gear set 840. The numerical value of the second forward speed ratio is determined by the ring gear/sun gear tooth ratios of the planetary gear sets 820 and 840. The third forward speed ratio is a direct drive or 1:1 ratio. The numerical value of the fourth and fifth forward speed ratios are determined utilizing the tooth ratios of all three planetary gear sets 820, 830 and 840. The numerical value of the sixth forward speed ratio is determined utilizing the ring gear/sun gear tooth ratios of the planetary gear sets 820 and 830.

Figures 10A, 10B:
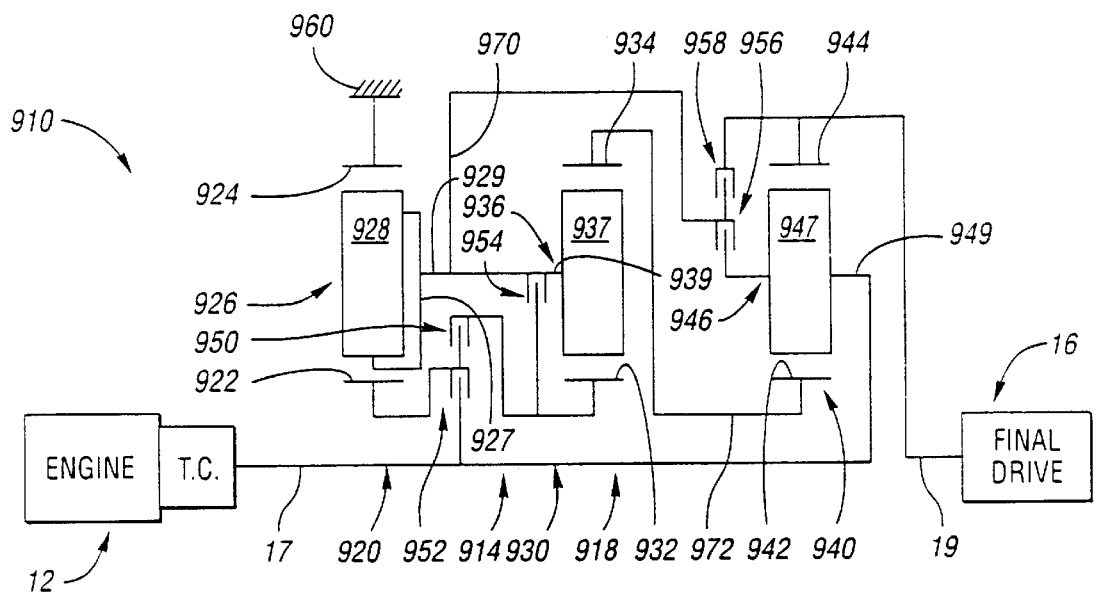

The powertrain 910, shown in FIG. 10a, includes the conventional engine and torque converter 12, a planetary transmission 914, and the conventional final drive mechanism 16. The engine and torque converter 12 are drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly 926. The planet carrier assembly 926 includes a plurality of intermeshing pinion gears 927 and 928 that are rotatably mounted on a carrier member 929 and disposed in meshing relationship with the sun gear member 922 and the ring gear member 924, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes five torque transmitting mechanisms 950, 952, 954, 956 and 958. The torque transmitting mechanisms 950, 952, 954, 956 and 958 are of the rotating type torque transmitting mechanisms, commonly termed clutches.

The input shaft 17 is continuously connected with the planet carrier assembly member 946. The output shaft is continuously connected with the ring gear member 944. The planet carrier assembly member 926 is continuously connected with the planet carrier assembly member 936 through the interconnecting member 970. The ring gear member 934 is continuously connected with the sun gear member 942 through the interconnecting member 972. The ring gear member 926 is continuously connected with the transmission housing 960.

The sun gear member 922 is selectively connectable with the sun gear member 932 through the torque transmitting mechanism 950. The sun gear member 922 is selectively connectable with the planet carrier assembly member 946 through the torque transmitting member 952. The sun gear member 932 is selectively connectable with the planet carrier assembly member 936 through the torque transmitting member 954. The planet carrier assembly member 946 is selectively connectable with the interconnecting member 970 through the torque transmitting member 956. The ring gear member 944 is selectively connectable with the interconnecting member 970 through the torque transmitting member 958.

The truth table of FIG. 10b describes the torque transmitting mechanism engagement sequence utilized to provide the reverse speed ratio and six forward speed ratios. The truth table also provides a set of examples for the ratios for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; and the R3/S3 value is the tooth ratio of the planetary gear set 940. It can also be determined from the truth table of FIG. 10b that each of the forward single step ratio interchanges are of the single transition variety.

Those skilled in the art, upon reviewing the engagement combinations, will recognize that the value of the reverse speed is determined utilizing the tooth ratio of the planetary gear set 920. The numerical value of the first, second and sixth forward speed ratios are determined utilizing the tooth ratios of all three planetary gear sets 920, 930 and 940. The third forward speed ratio is a direct drive or 1:1 ratio. The numerical value of the fourth forward speed ratio is determined utilizing the tooth ratio of the planetary gear set 940. The numerical value of the fifth forward speed ratio is determined utilizing the tooth ratios of the planetary gear sets 920 and 940.

Figures 11A, 11B:
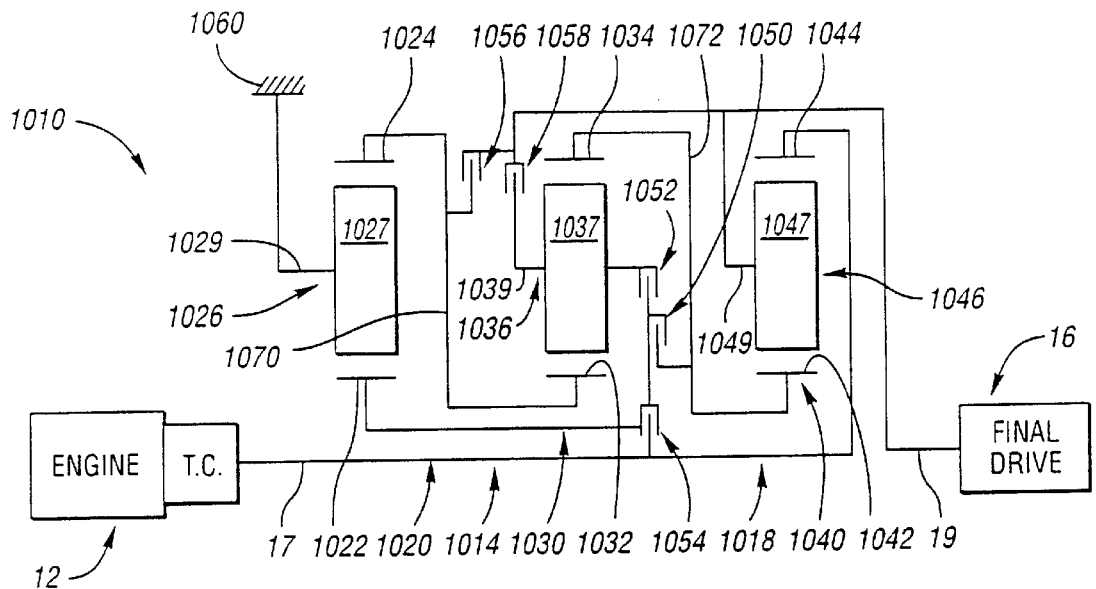

A powertrain 1010, shown in FIG. 11a, includes the conventional engine and torque converter 12, a planetary transmission 1014, and the conventional final drive mechanism 16. The engine and torque converter are drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly 1026. The planet carrier assembly 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear arrangement 1018 also includes five torque transmitting mechanisms 1050, 1052, 1054, 1056 and 1058. The torque transmitting mechanisms 1050, 1052, 1054, 1056 and 1058 are of the rotating type torque transmitting mechanisms, commonly termed clutches.

The input shaft 17 is continuously connected with the ring gear member 1044. The output shaft 19 is continuously connected with the planet carrier assembly member 1046. The planet carrier assembly member 1026 is continuously connected with the transmission housing 1060. The ring gear member 1024 and sun gear member 1032 are continuously connected by an interconnecting member 1070. The ring gear member 1034 and sun gear member 1042 are continuously connected by an interconnecting member 1072.

The sun gear member 1042 is selectively connectable with the sun gear member 1022 through the torque transmitting mechanism 1050. The sun gear member 1022 is selectively connectable with the planet carrier assembly member 1036 through the torque transmitting mechanism 1052. The sun gear member 1022 is selectively connectable with the ring gear member 1044 through the torque transmitting mechanism 1054. The planet carrier assembly member 1046 is selectively connectable with the interconnecting member 1070 through the torque transmitting mechanism 1056. The planet carrier assembly member 1036 is selectively connectable with the planet carrier assembly member 1046 through the torque transmitting mechanism 1058.

The truth table shown in FIG. 11b describes the engagement combinations and the engagement sequence necessary to provide the reverse drive ratio and the eight forward speed ratios. A sample of the numerical values for the ratios is also provided in the truth table of FIG. 11b. These values are determined utilizing the ring gear/sun gear tooth ratios also given in FIG. 11b. The R1/S1 value is the tooth ratio for the planetary gear set 1020; the R2/S2 value is the tooth ratio for the planetary gear set 1030; and the R3/S3 value is the tooth ratio for the planetary gear set 1040. Also given in FIG. 11b is a chart describing the step ratios between the adjacent forward speed ratios and the reverse to first forward speed ratio. The chart provides the ratio steps for a six speed, seven speed, and eight speed transmission. These values are also determined utilizing the sample tooth ratios set forth in FIG. 11b.

Those skilled in the art will recognize that the numerical value of the reverse speed ratio is determined utilizing the ring gear/sun gear tooth ratio of the planetary gear set 1020. The first, fifth, sixth, seventh and eighth forward speed ratios are determined utilizing the tooth ratios of all three planetary gear sets 1020, 1030 and 1040. The second forward speed ratio is determined utilizing the tooth ratios of the planetary gear sets 1020 and 1040. The third forward speed ratio is determined utilizing the tooth ratio of the planetary gear set 1040. The fourth forward speed ratio is a 1:1 or direct drive.

Figures 12A, 12B:
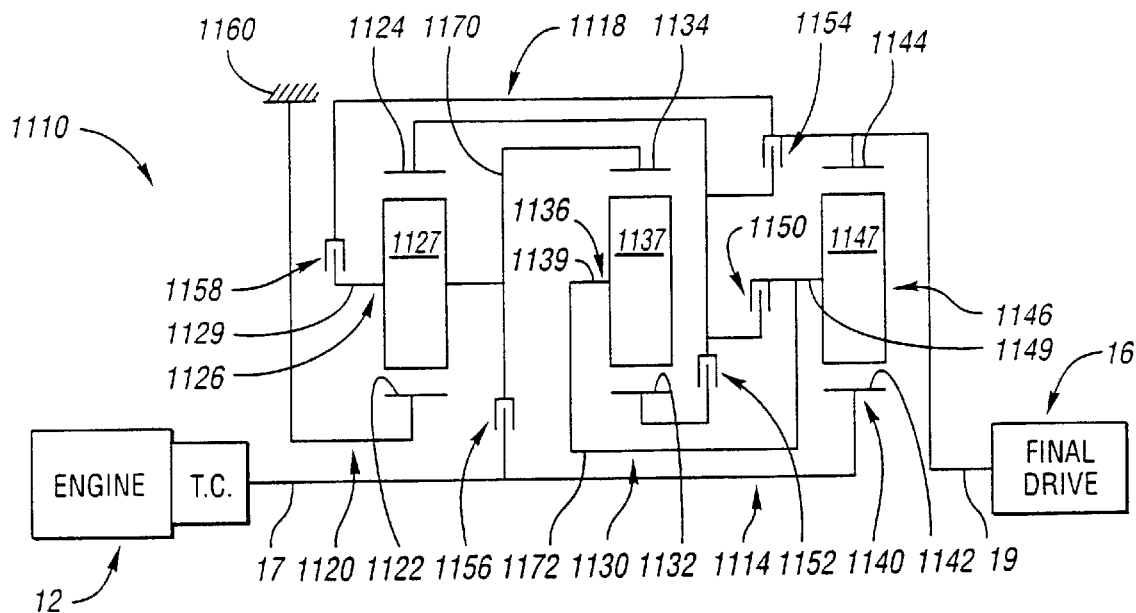

A powertrain 1110, shown in FIG. 12a, has a conventional engine and torque converter 12, a planetary transmission 1114, and the conventional final drive mechanism 16. The planetary transmission 1114 includes a planetary gear arrangement 1118 which is connected with the engine and torque converter 12 through the input shaft 17 and with the final drive mechanism 16 through the output shaft 19. The planetary gear arrangement 1118 includes three planetary gear sets 1120, 1130 and 1140.

The planetary gear set 1120 includes a sun gear member 1122, a ring gear member 1124, and a planet carrier assembly 1126. The planet carrier assembly 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of pinion gears 1137 rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear arrangement 1118 also includes five torque transmitting mechanisms 1150, 1152, 1154, 1156 and 1158. The torque transmitting mechanisms 1150, 1152, 1154, 1156 and 1158 are of the rotating type torque transmitting mechanisms, commonly termed clutches.

The input shaft 17 is continuously connected with the sun gear member 1142. The output shaft 19 is continuously connected with the ring gear member 1144. The planet carrier assembly member 1126 is continuously connected with the ring gear member 1134 through the interconnecting member 1170. The planet carrier assembly member 1136 is continuously connected with the planet carrier assembly member 1146 through the interconnecting member 1172. The sun gear member 1122 is continuously connected with the transmission housing 1160.

The planet carrier assembly member 1146 and interconnecting member 1172 are selectively connectable with the ring gear member 1124 through the torque transmitting mechanism 1150. The sun gear member 1132 is selectively connectable with the ring gear member 1124 through the torque transmitting mechanism 1152. The ring gear member 1144 is selectively connectable with the ring gear member 1124 through the torque transmitting mechanism 1154.

The sun gear member 1142 is selectively connectable with the planet carrier assembly member 1126 and with the interconnecting member 1170 through the torque transmitting mechanism 1156. The planet carrier assembly member 1126 is selectively connectable with the ring gear member 1144 through the torque transmitting mechanism 1158.

The truth table, shown in FIG. 12b, describes the engagement sequence and engagement combinations utilized with the present family member to provide a reverse drive ratio and seven forward speed ratios. The truth table of FIG. 12b also provides a set of example numbers that can be established in the planetary gear arrangement 1118 utilizing ring gear/sun gear tooth ratios. The R1/S1 value is the ring gear/sun gear tooth ratio of the planetary gear set 1120; the R2/S2 value is the ring gear/sun gear tooth ratio of the planetary gear set 1130; and the R3/S3 value is the ring gear/sun gear tooth ratio of the planetary gear set 1140.

The chart of FIG. 12b describes the ratio steps between adjacent forward speed ratios for both a six speed transmission and a seven speed transmission. These step ratios are established utilizing the example speed ratios given in the truth table. As also shown in the truth table, the torque transmitting mechanism 1150 can remain engaged through the neutral condition, thereby simplifying the forward/reverse interchange.

Those skilled in the art will recognize that the numerical value of the reverse speed ratio is determined utilizing the ring gear/sun gear tooth ratio of the planetary gear set 1140. The numerical value of the first and sixth forward speed ratios are determined utilizing the tooth ratios of the planetary gear sets 1120 and 1140. The numerical value of the second, fourth and seventh forward speed ratios are determined utilizing the tooth ratios of all three planetary gear sets 1120, 1130 and 1140. The third forward speed ratio is a 1:1 or direct drive ratio. The fifth forward speed ratio is determined utilizing the tooth ratio of the planetary gear set 1120.

While the best modes for carrying out the invention have been described in detail, those familiar with the art to which this invention relates will recognize various alternative designs and embodiments for practicing the invention within the scope of the appended claims.

What is claimed is:

1. A family of transmissions wherein each family member comprises:

an input shaft;

an output shaft;

first, second and third planetary gear sets each having first, second and third members;

said input shaft being continuously interconnected with a member of one of said planetary gear sets, said output shaft being continuously interconnected with another member of one of said planetary gear sets;

a first interconnecting member continuously interconnecting said first member of said first planetary gear set and said first member of said second planetary gear set;

a second interconnecting member continuously interconnecting said second member of said second planetary gear set and said first member of said third planetary gear set;

a stationary transmission housing continuously connected with said second member of said first planetary gear set;

a first torque-transmitting clutch selectively interconnecting a member of said first planetary gear set with said first interconnecting member, said second interconnecting member or a member of said second or third planetary gear sets;

a second torque-transmitting clutch selectively interconnecting a member of said second planetary gear set with said first interconnecting member, said second interconnecting member or a member of said first or third planetary gear sets;

a third torque-transmitting clutch selectively interconnecting a member of said third planetary gear set with said first interconnecting member, said second interconnecting member, or a member of said first or second planetary gear sets;

a fourth torque-transmitting clutch selectively interconnecting a member of said first, second, or third planetary gear sets with another member of said first, second, or third planetary gear sets;

a fifth torque-transmitting clutch selectively interconnecting a member of said first, second, or third planetary gear sets with said input shaft, said output shaft or a member of said first, second or third planetary gear sets; and said torque-transmitting clutches being engaged in combinations of two to establish at least six forward speed ratios and a reverse ratio between said input shaft and said output shaft.

2. The family of transmissions defined in claim 1, wherein said torque-transmitting clutches in at least one of said family members are selectively engaged in combinations of two to establish at least seven forward speed ratios and a reverse ratio.

3. The family of transmissions defined in claim 1, wherein said torque-transmitting clutches in at least one of said family members are selectively engaged in combinations of two to establish at least eight forward speed ratios and a reverse ratio.

4. A family of transmissions having a plurality of family members wherein each family member comprises:

an input shaft;

an output shaft;

a planetary gear arrangement having first, second and third planetary gear sets, each planetary gear set having first, second and third members;

said input shaft being continuously interconnected with a member of one of said planetary gear sets, said output shaft being continuously interconnected with another member of one of said planetary gear sets;

a first interconnecting member continuously interconnecting said first member of said first planetary gear set and said first member of said second planetary gear set;

a second interconnecting member continuously interconnecting said second member of said second planetary gear set and said first member of said third planetary gear set;

a stationary transmission housing continuously connected with said second member of said first planetary gear set; and five selectively engageable torque-transmitting clutches for selectively interconnecting said members of said planetary gear sets with said input shaft, said output shaft, or another member of one of said planetary gear sets, said torque-transmitting clutches being engaged in combinations of two to establish at least six forward speed ratios and one reverse ratio between said input shaft and said output shaft.

5. The family of transmissions defined in claim 4, wherein a first of said five torque-transmitting clutches is selectively operable for interconnecting a member of said first planetary gear set with said first interconnecting member, said second interconnecting member or a member of said second or third planetary gear sets.

6. The family of transmissions defined in claim 4, wherein a second of said five torque-transmitting clutches is selectively operable for interconnecting a member of said second planetary gear set with said first interconnecting member, said second interconnecting member or a member of said first or third planetary gear sets.

7. The family of transmissions defined in claim 4, wherein a third of said five torque-transmitting clutches is selectively operable for interconnecting a member of said third planetary gear set with said first interconnecting member, said second interconnecting member, or a member of said first or second planetary gear sets.

8. The family of transmissions defined in claim 4, wherein a fourth of said five torque-transmitting clutches is selectively operable for interconnecting a member of said first, second, or third planetary gear sets with another member of said first, second or third planetary gear sets.

9. The family of transmissions defined in claim 4, wherein a fifth of said five torque-transmitting clutches is selectively operable for interconnecting a member of said first, second or third planetary gear sets with said input shaft, said output shaft or a member of said first, second, or third planetary gear sets.

10. The family of transmissions in claim 4, wherein planet carrier assembly members of each of said planetary gear sets are of the single-pinion type.

11. The family of transmissions in claim 4, wherein planet carrier assembly member at least one of said planetary gear sets are of the double-pinion type.

* * * * *